Dec. 8, 1959  J. H. GILSON  2,916,327
POWER OPERATED CONVERTIBLE TOP HEADER LATCH
Filed Dec. 29, 1958  3 Sheets-Sheet 1
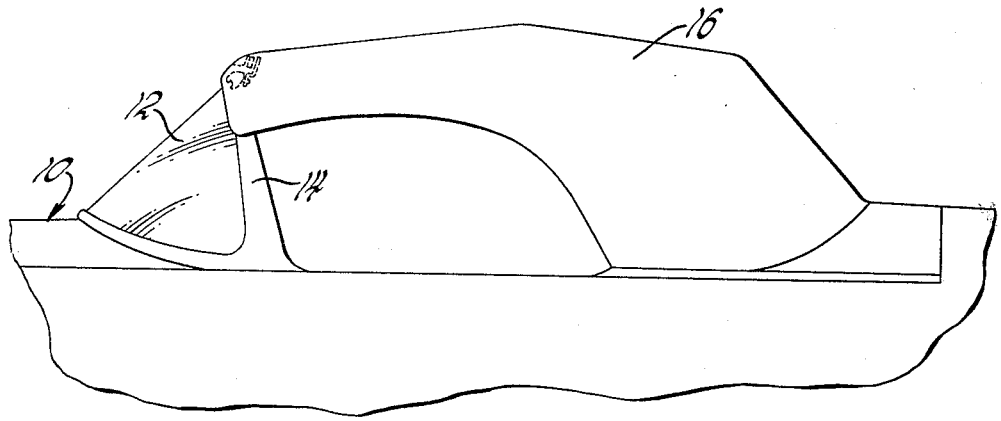
Fig. 1
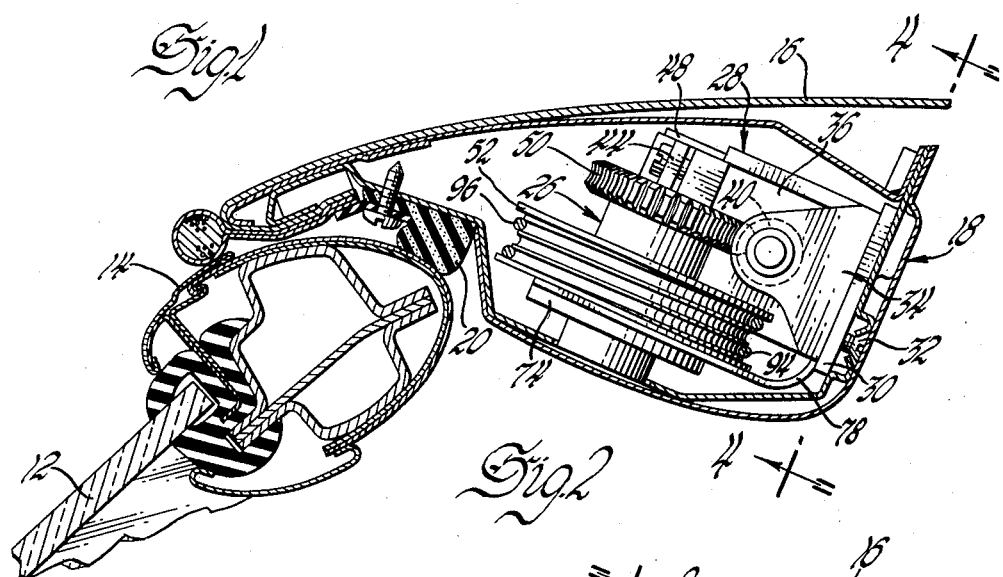
Fig. 2
Fig. 3
INVENTOR.
Joseph H. Gilson
BY
R. F. Barnard
ATTORNEY

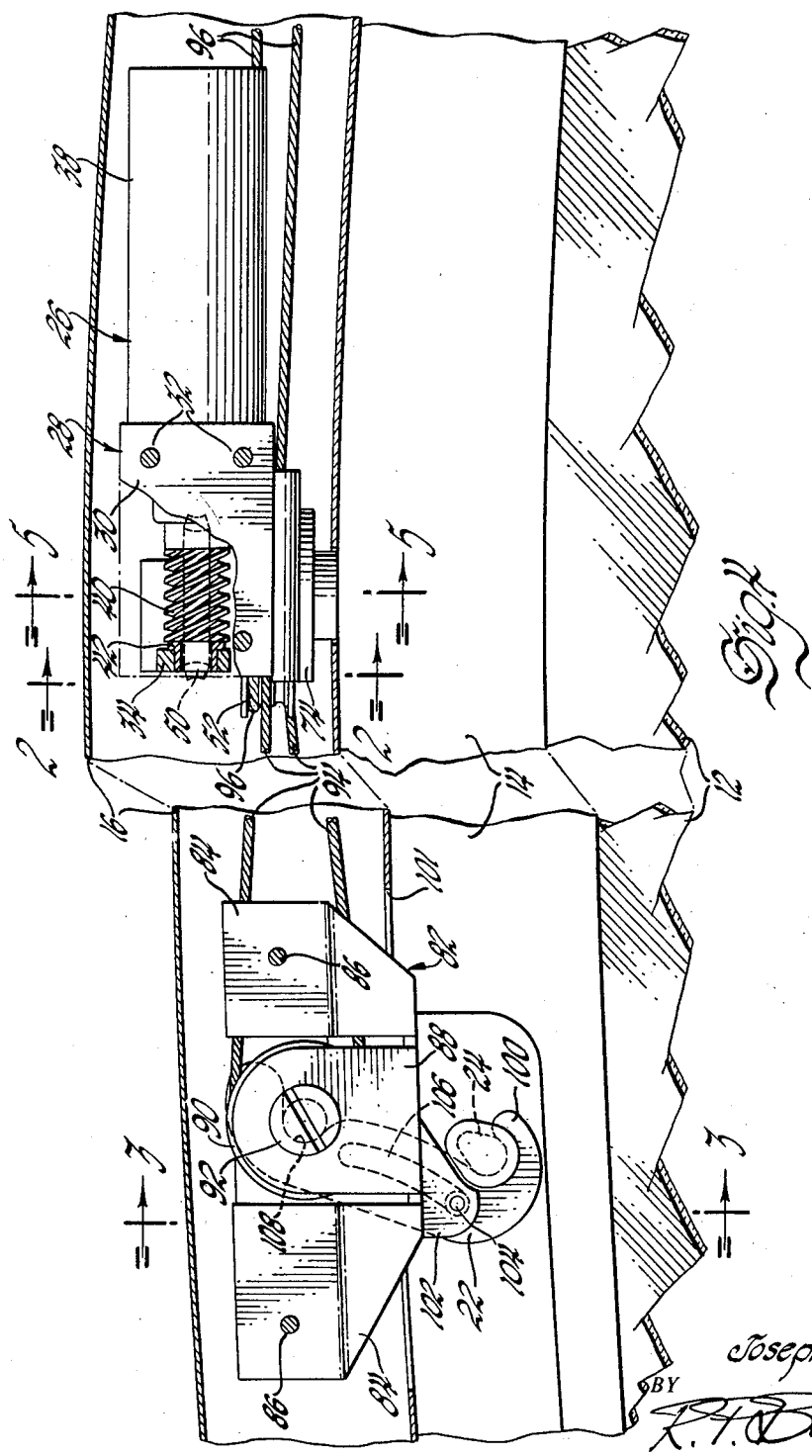

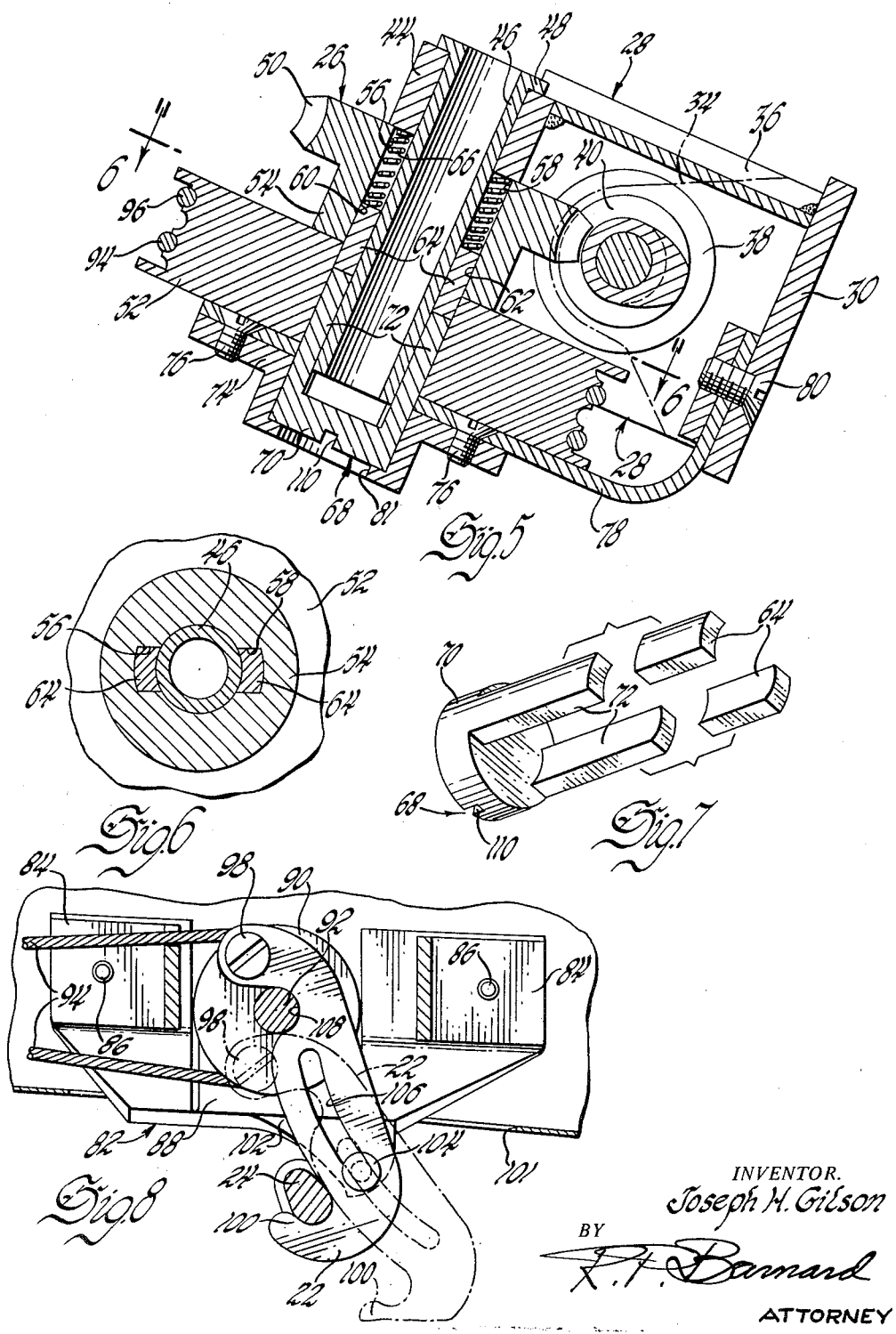

United States Patent Office 2,916,327
Patented Dec. 8, 1959

2,916,327

POWER OPERATED CONVERTIBLE TOP HEADER LATCH

Joseph H. Gilson, Warren, Mich., assignor to General Motors Corporation, Detroit, Mich., a corporation of Delaware Application December 29, 1958, Serial No. 783,311

10 Claims. (Cl. 296—120)

The present invention relates to a power operated latching mechanism for a convertible top making it possible for an occupant to automatically unlatch preparatory to lowering a convertible top.

Power devices for raising and lowering vehicle tops have been used for a great number of years, however, it has been the practice to manually latch such a top to the windshield header after the power mechanism has moved the convertible top to a closed position. It is an object of the present invention to provide a simple mechanism whereby the latching mechanism may be accomplished by power means to provide in combination with a power top mechanism a truly power actuated convertible top.

The subject top latching mechanism includes a centrally disposed power unit and a pair of outwardly disposed latches operatively connected thereto all disposed within a somewhat enlarged top header member. The power unit is connected to the outwardly disposed latch members through a suitable gear and pulley arrangement which permits simultaneous actuation of the latches.

In addition to providing a mechanism for power control of the top latching mechanism, the present invention also embodies a unique device which permits manual operation of the top latching mechanisms in the event of a power failure.

The details as well as other objects and advantages of the present invention will be apparent from a perusal of the detailed description which follows:

In the drawings:

Figure 1 is a partial view of a vehicle embodying the subject invention;

Figure 2 is a view along line 2—2 of Figure 4;

Figure 3 is a view along line 3—3 of Figure 4;

Figure 4 is a partially sectioned elevational view showing the general arrangement of the power unit and one of the latches;

Figure 5 is a view along line 5—5 of Figure 4;

Figure 6 is a view along line 6—6 of Figure 5;

Figure 7 is an exploded perspective view showing the pawl members used to provide a releasable drive from the power unit to the latches; and Figure 8 is a view along line 8—8 of Figure 3.

Referring to Figure 1, a vehicle is shown generally at 10 and includes a windshield 12 supported within a windshield header 14 and a convertible top 16 adapted to be suitably latched to the windshield header. Convertible top 16 is intended to be power actuated for purposes of raising and lowering the same, however, the power mechanism for so actuating the top is not shown since such constitutes no part of the present invention.

The power latching mechanism may best be seen by referring first to Figures 2 through 4 where it will be noted that an enlarged top header is shown generally at 18. The convertible top fabric is adapted to be secured to header 18 in the usual manner and the header adapted to be abuttingly supported on the windshield header 14 through a sealing member 20. The power latching mechanism is adapted to be completely disposed within the top header 18 and is completely concealed thereby save for the slight protrusion therefrom of the outboard latch members 22 which extend from the header to engage with studs 24 suitably fixed to windshield header 14.

A power unit is centrally disposed within top header 18 and is shown generally at 26. Power unit 26 includes a supporting frame 28 including a member 30 adapted to be suitably secured through studs 32 to the rear wall of top header 18. In addition frame 28 includes a pair of side members 34 and 36 which extend generally at right angles to member 30. A motor 38 is supported upon side frame member 36 and includes a rotary shaft to which a helical gear member 40 is fixed. The motor shaft and gear member 40 are suitably supported within bushings 42 disposed within side members 34 and 36 of frame 28.

As best seen in Figures 2 and 5, a clamping member 44 is supported from frame 28 and clampingly supports a bearing shaft 46 which rests upon a collar 48. A worm gear member 50 is rotatably supported upon bearing shaft 46 and is adapted to coact with and be driven by motor gear 40. A pulley 52 is similarly rotatably mounted on bearing shaft 46. For reasons to be subsequently discussed, hub 54 of worm gear 50 includes a pair of axially extending and oppositely disposed slots 56 and 58 formed therein. A pair of similarly disposed slots 60 and 62 are formed within pulley 52. A set of pawls 64 is slidably disposed within gear slots 56 and 58 and biased by springs 66 to partially extend into slots 60 and 62 of pulley 52. A second pawl member 68 includes a head portion 70 and leg portions 72 the latter which extend within gear slots 60 and 62 to provide a stop against which pawls 64 seat. Member 68 is retained in position by a cap member 74 secured through screws 76 to an angle iron 78 in turn fixed to frame member 30 through screws 80.

Cap member 74 includes an opening 81 through which a suitable screwdriver type tool may be inserted to slide pawl member 68 upwardly to move pawl set 64 out of engagement with gear slots 60 and 62 permitting the pulley to be manually rotated in the event of a power failure precluding the operation of motor 38.

During normal operation the parts are in the position shown in Figure 5 whereby actuation of motor 38 will cause rotation of worm gear 50 to be transmitted through pawls 64 to pulley 52.

A pair of latch devices indicated generally at 82 are provided at each side or outboard of top header 18. Due to their identical construction only one of the latch devices need be described in detail. The latch construction is best shown in Figures 3, 4 and 8 and includes a generally U-shaped bracket member 84 suitably fixed to top header 18 through screws 86. Bracket 84 includes an intermediate upstanding portion 88 on which a pulley 90 is rotatably supported through a pin member 92. Pulley 90 is connected through a cable 94 to one of the two sets of sheaves formed on the power mechanism pulley 52. Another cable 96 controls the other outboard latch, not shown.

Latch member 22 is loosely articulated to pulley 90 through an off-center or eccentric pin 98. The free end of latch 22 includes a hooked portion 100 which projects through an opening 101 in header 18 and is adapted to coact with windshield header mounted stud 24 to secure top 10 in a latched position. Bracket 84 also includes a depending portion 102 to which a pin 104 is fixed. An arcuate cam slot 106 formed intermediate the ends of latch 22 is adapted to receive pin 104. Thus, as best seen in Figure 8, as pulley 90 is rotated in a clockwise direction by cable 94, the upper end of latch 22 will be rotated whereby the camming action between pin 104 and slot 106 will cause the latch to also rotate about pin 98 and move hooked portion 100 out of engagement with stud 24 unlocking top 16 preliminary to lowering the same. Latch member 22 is recessed intermediate its ends to provide a notch 108 which coacts with pulley pin 92 to provide a stop to limit the counterclockwise or latching rotation of pulley 90.

As already noted, in the event of a power failure an appropriate screwdriver-like tool may be inserted within opening 81 of cap 74 to engage the notch 110 in pawl member 68 to move pawl set 64 out of engagement with pulley slots 60 and 62 to permit pulley 52 to be manually rotated to actuate latches 22 in the event of a power failure.

To provide access to power unit 26 and latch devices 82 for servicing suitable openings and covers, not shown, may be provided in top header 18.

I claim:

1. An automobile convertible top latching mechanism comprising a windshield header, a top header adapted to be disposed proximate said windshield header when the top is in a closed position, a latching mechanism disposed within said top header, said mechanism including a centrally disposed power unit having a motor, a pulley member, gear means for transmitting power from said motor to said pulley, a pair of latch devices respectively disposed outboard of said power unit, each of said devices including a pulley, means coupling each latch pulley with the power unit pulley, a latch element eccentrically articulated to each latch pulley, a plurality of stud members secured to said windshield header, each latch element including an end adapted to engage with one of said stud members to latch said top to said header, and a cam device adapted to move each latch element out of engagement with the associated stud member upon rotation of the latch unit pulley.

2. An automobile convertible top latching mechanism comprising a windshield header, a top header adapted to be disposed proximate said windshield header when the top is in a closed position, a latching mechanism disposed within said top header, said mechanism including a centrally disposed power unit having a motor, a pulley member, gear means for transmitting power from said motor to said pulley, a pair of latch devices respectively disposed outboard of said power unit, each of said devices including a pulley, means coupling each latch pulley with said power unit pulley, a latch element eccentrically articulated to each latch pulley, a plurality of stud members secured to said windshield header, each latch element including an end adapted to engage with one of said stud members to latch said top to said header, a slot formed intermediate the ends of the latch element, a pin fixed relative to said latch element and extending within said slot, rotation of said latch pulley causing the fixed pin to cam said latch into or out of engagement with said stud.

3. An automobile convertible top latching mechanism comprising a windshield header, a top header adapted to be disposed proximate said windshield header when the top is in a closed position, a latching mechanism disposed within said top header, said mechanism including a power unit having a motor, a first pulley member, and gear means for transmitting power from said motor to said pulley, said mechanism also including a plurality of latch devices, each of said devices including a pulley, means coupling each latch pulley with said power unit pulley, a latch element eccentrically articulated to each latch pulley, a plurality of stud members secured to said windshield header, each latch element including an end adapted to engage with one of said stud members to latch said top to said header, and a cam device adapted to move each latch element out of engagement with the associated stud member upon rotation of said latch unit pulley.

4. An automobile convertible top latching mechanism as set forth in claim 3 in which said gear means includes a clutch device for interrupting the operative connection between said motor and said first pulley member to permit manual operation of the latch devices.

5. An automobile convertible top latching mechanism as set forth in claim 3 in which said gear means comprises a first gear element driven by said motor, a fixed bearing shaft, a second gear element rotatably mounted on said shaft, said first pulley member rotatably mounted on said shaft proximate said second gear element, axially aligned slot means respectively formed in said second gear element and said first pulley member, first and second pawl means slidably disposed in said slot means, spring means biasing said first pawl means into abutting relation with the second pawl means permitting the first pawl means to extend within both the gear and pulley slot means to drivingly connect the second gear element and first pulley member, said second pawl means being axially movable against the force of the spring means to move the first pawl set out of engagement with the pulley slots permitting rotation of the first pulley member relative to the second gear element.

6. An automobile convertible top latching mechanism as set forth in claim 5 in which said second pawl means includes a head portion adapted to abuttingly engage one end of said fixed bearing shaft to limit the axial movement and prevent said second pawl means from entering the slot means in the second gear element.

7. An automobile convertible top latching mechanism as set forth in claim 6 in which each of said first and second slot means includes a pair of diametrically oppositely disposed slots.

8. An automobile convertible top latching mechanism comprising a windshield header, a top header adapted to be disposed proximate said windshield header when the top is in a closed position, a latching mechanism disposed within said top header, said mechanism including a power unit having a motor, a pulley member, and gear means for transmitting power from said motor to said pulley, said means including a manually operable device for interrupting the drive connection between said motor and said pulley whereby the pulley may be rotated relative to the motor, said mechanism also including a plurality of latch units, a stud element mounted on said windshield header proximate each latch unit when the headers are proximately disposed, each latch unit including a pulley member, means operably connecting said power and latch unit pulleys, a latch element rotatable with the latch unit pulley, said latch element including a portion adapted to latchingly engage with said stud member to secure the top to said windshield header upon rotation of said latch unit pulley.

9. An automobile convertible top latching mechanism comprising a windshield header, a top header adapted to be disposed proximate said windshield header when the top is in a closed position, a latching mechanism disposed within said top header, said mechanism including a power unit having a motor, a pulley member, and gear means for transmitting power from said motor to said pulley, said means including a manually operable device for interrupting the drive connection between said motor and said pulley whereby the pulley may be rotated relative to the motor, said mechanism also including a plurality of latch units, a stud element mounted on said windshield header proximate each latch unit when the headers are proximately disposed, each latch unit including a pulley member, cable means connecting said power and latch unit pulleys, a latch element eccentrically articulated to said latch unit pulley, said latch element including a portion adapted to latchingly engage with said stud member, and a cam device for moving the element into or out of latching engagement with the associated stud as the latch unit pulley is rotated.

10. An automobile convertible top latching mechanism as set forth in claim 9 in which the latch unit element is eccentrically articulated at one end to the latch unit pulley, the other end of said element including a hooked portion adapted to latchingly engage the associated stud member, an arcuate groove formed intermediate the ends of the element, and a pin fixed relative to the element and projecting within said groove, rotation of the latch unit pulley causing said pin to cam the element into or out of engagement with the stud member.

References Cited in the file of this patent

UNITED STATES PATENTS

| | | |
|---|---|---|
| 2,017,564 | Claud-Mantle | Oct. 15, 1935 |
| 2,062,597 | Moore | Dec. 1, 1936 |
| 2,305,715 | Keller | Dec. 22, 1942 |
| 2,339,537 | Wise | Jan. 18, 1944 |
| 2,486,905 | Ackermans | Nov. 1, 1949 |
| 2,789,852 | Eads | Apr. 23, 1957 |
| 2,831,718 | Hallek et al. | Apr. 22, 1958 |
| 2,852,292 | Galla | Sept. 16, 1958 |

FOREIGN PATENTS

| | | |
|---|---|---|
| 1,145,292 | France | Oct. 24, 1957 |